UNITED STATES PATENT OFFICE.

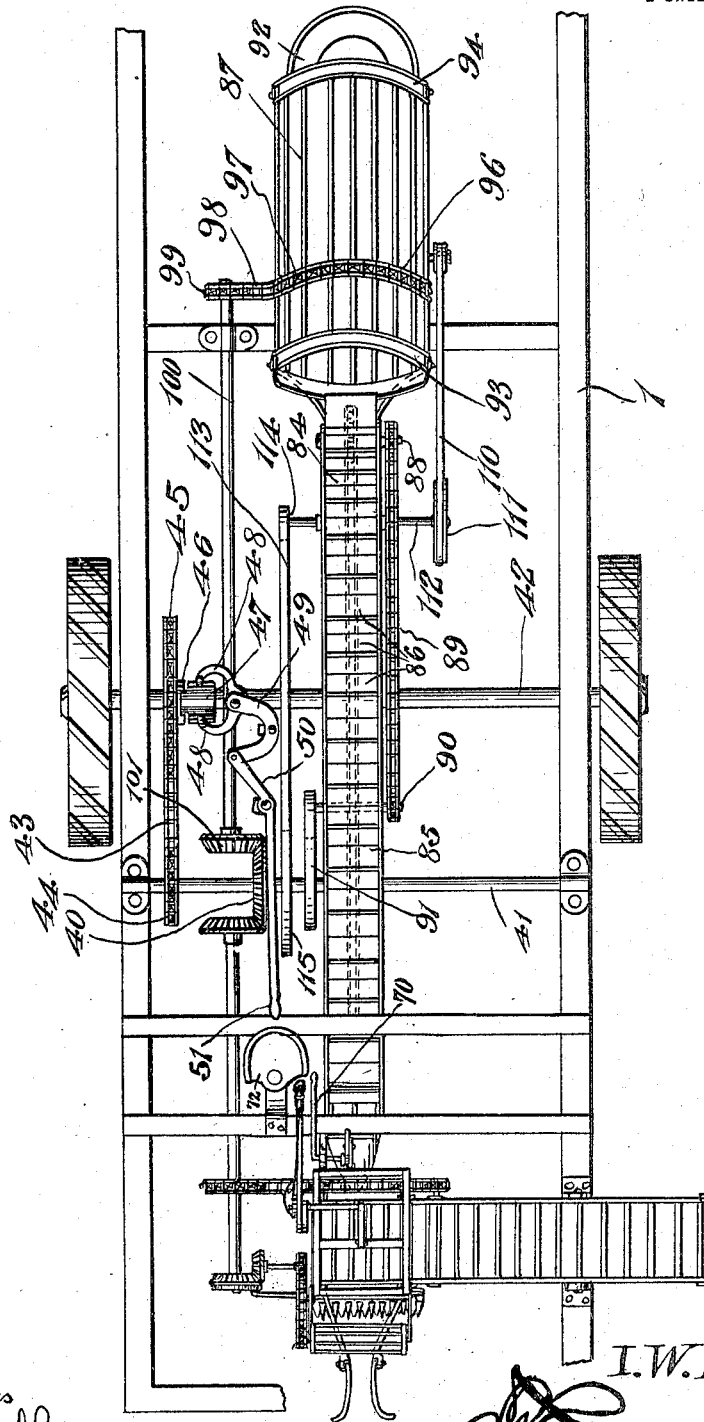

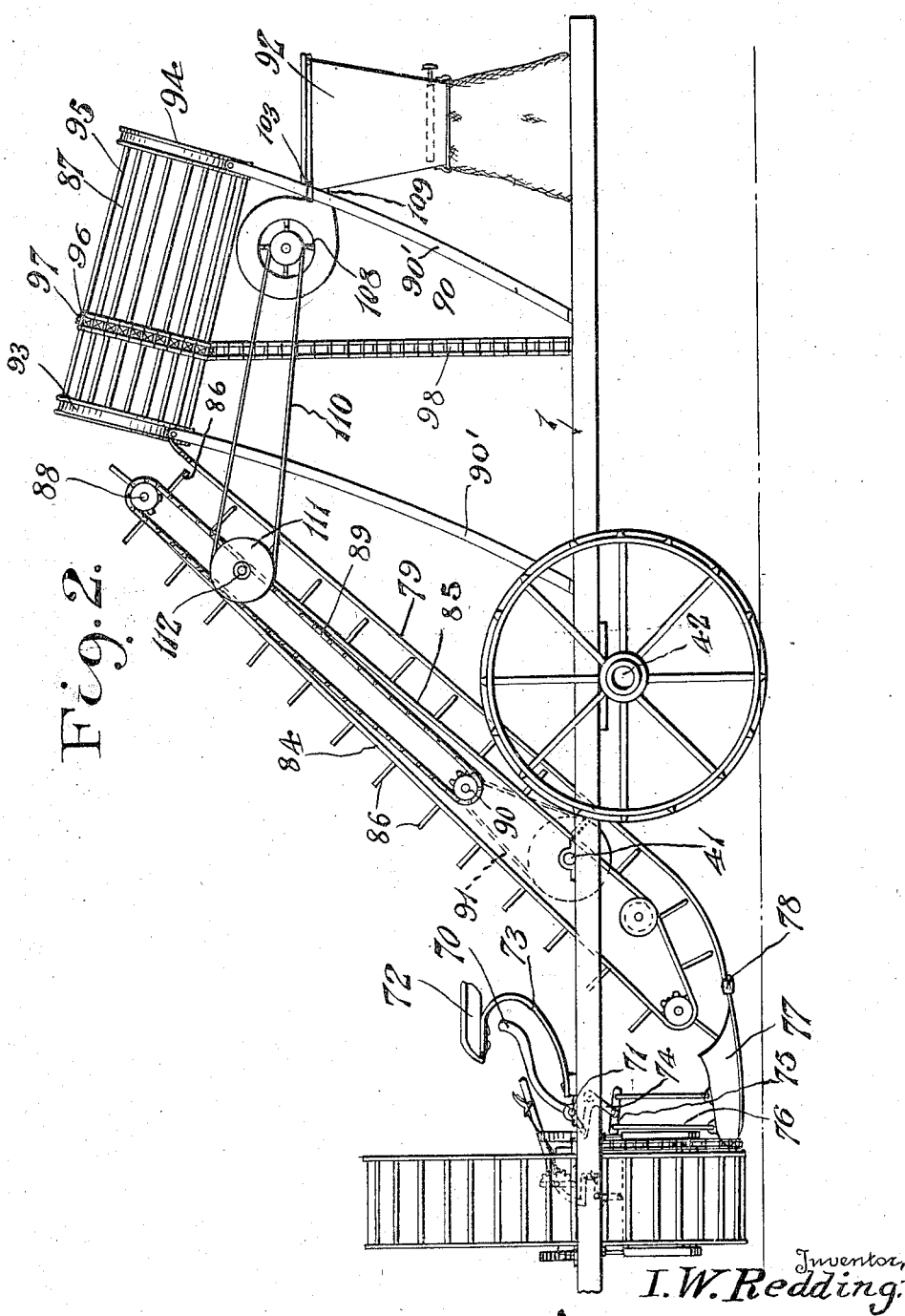

ISRAEL W. REDDING, OF CLAY CENTER, KANSAS.

BEET-HARVESTER.

1,232,086.   Specification of Letters Patent.   Patented July 3, 1917.

Application filed January 9, 1915. Serial No. 1,394.

*To all whom it may concern:*

Be it known that I, ISRAEL W. REDDING, a citizen of the United States, residing at Clay Center, in the county of Clay and State of Kansas, have invented certain new and useful Improvements in Beet-Harvesters; and I do hereby declare the following to be a full, clear, and exact description of the invention, such as will enable others skilled in the art to which it appertains to make and use the same.

This invention relates to harvesters for beets, potatoes or like agricultural products, and more particularly to the type of harvester including mechanisms for topping, uprooting and carrying the harvested vegetable.

The primary object of this invention is to provide a harvester as specified, which includes in combination, an uprooting plow, a conveyer, an angularly disposed cylinder for receiving the beets or like vegetables from the conveyer, and means for rotating the cylinder by the travel of the harvester.

Another object of this invention is to provide a cylinder as specified, which is provided with a plurality of circumferentially spaced longitudinally extending slots to permit the dirt or soil to fall therethrough, from the cylinder, and further to mount a fan below the cylinder for blowing a blast of air about the vegetables as they leave the cylinder.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved beet harvester.

Fig. 2 is a side elevation of the improved beet harvester.

Referring more particularly to the drawings, 1 designates the supporting frame of the harvester upon which is mounted a transversely extending shaft 41. A bevel gear 40 is mounted upon the shaft 41. The transversely extending shaft 41 is rotated by the rotation of the drive axle 42 of the harvester through the medium of a sprocket chain 43 and suitable sprockets 44 and 45 which are mounted upon the shaft 41 and the axle 42 respectively.

The sprocket 45 has a clutch segment 46 formed upon one face thereof, which is mounted for coaction with a clutch segment 47 which is slidably mounted or feathered upon the axle 42. The feathered clutch segment 47 has arms 48 connected thereto, which arms are in turn connected to the arcuate end 49 of the lever 50. The lever 50 is pivotally carried by the supporting frame 1 and projects forwardly thereof, being connected to a hand lever 51, to provide for the manual sliding movement of the clutch segment 47 along the axle 42 for throwing the shaft 41 into or out of operative connection with the axle 42.

The frame 1 has a lever 70 pivotally connected thereto as at 71, and positioned a short distance forwardly of the seat 72. The seat 72 is of the ordinary construction supported by a resilient standard 73. The lever 70 is connected to a bell crank arm 74, which is in turn connected to a link 75.

The link 75 has rods 76 connected thereto which extend downwardly beneath the frame and are connected to the upper edges of an uprooting plow 77. The uprooting plow 77 has its sides upturned as is clearly shown in Fig. 2 of the drawing, and it is pivotally connected as is shown at 78 to a plurality of rods 79. The rods 79 extend upwardly from the pivotal point 78, and form an elevator platform or base, above which the conveyer 84 travels. The conveyer 84 is formed of suitable flexible belts or chains 85 which have a plurality of fingers or pockets 86 secured thereto at spaced intervals along its length, which fingers or pockets 86 receive the beets, potatoes or the like from the hollow pocket formed by the upturning of the sides of the plow 77, and elevate them upwardly over the rods 79, depositing them into a drum 87. The elevator 85 is propelled by the rotation of a drum 88, which is rotated by a sprocket chain 89. The sprocket chain 89 is moved by the rotation of a sprocket 90, which has connection with the shaft 41, as is shown at 91 in Figs. 1 and 2 of the drawings.

The cylinder 87 is supported above the supporting frame 1, by suitable braces 90' which extend upwardly from the platform at an incline and support the cylinder 87 angularly above the upper surface of the supporting frame 1, so that the beets, potatoes or the like will travel downwardly through the cylinder and fall from the rear open end thereof into the hopper 92. The cylinder 87 is constructed of rings 93 and 94 which form the ends thereof, and which have secured thereto at spaced intervals about their circumference a plurality of rods 95, extending from one ring to the other and forming a casing for the cylinder which is provided with longitudinal spaces between the rods, to permit of dirt or other foreign matter falling through between the rods. The rods 95 are placed so as to prevent beets, potatoes or the like from falling therebetween.

When the harvester is used for harvesting potatoes, the cylinder 87 will act as a sorter, permitting the small potatoes to fall through and out of the cylinder between the rods, thereby separating the large and small potatoes, and depositing the large ones within the hopper 92.

The cylinder 87 has a band 96 extending about the circumference thereof, which band has sprocket teeth 97 formed thereupon, about which a sprocket chain 98 travels. The sprocket chain 98 also travels about a sprocket 99, which is carried by a shaft 100. The shaft 100 is geared, by means of a bevel gear 101, for rotation by the shaft 41 and the bevel gear 40. The rotation of the drum will further facilitate the separating of the product being harvested, from dirt or the like.

The hopper 92 is supported rearwardly of and a short distance below the rear lower end of the cylinder or drum 87, by transversely extending bracing arms 103, which are secured to the upstanding braces 90.

A fan 108 is supported adjacent to the upper end of the hopper 92 and has its egressing or outlet spout 109 positioned for forcing air across the mouth or upper end of the hopper 92, for blowing dust away from the hopper and the operator of the same. The fan 108 is operated by a belt connection shown at 110, with a pulley 111 which is mounted upon a shaft 112. The shaft 112 is rotatably carried by the supporting structure of the beet harvester and is connected for rotation by the shaft 41, through the medium of a belt 113 which passes over pulleys 114 and 115, carried by the shafts 112 and 41 respectively.

In the operation of the improved beet harvester: The uprooting plow 77 is properly adjusted, through the actuation of the lever 70 for uprooting the beets, potatoes or other agricultural products, which products are passed upwardly over the top of the uprooting plow and are engaged by the fingers or pockets 86, which elevate them over the rods 79 and deposit them into the rotary cylinder 87. The cylinder 87 is mounted for rotation transversely to the direction of travel of the beet harvester and it inclines downwardly as it extends rearwardly along the frame, so that the beets, potatoes or the like will travel about the interior of the cylinder and pass longitudinally therethrough for depositing into the hopper 92.

From the foregoing description taken in connection with the accompanying drawings the advantages of construction and of the method of operation of the improved beet harvester will be readily apparent to those skilled in the art to which this invention appertains and, while in the foregoing description, the principle of the operation of the invention has been described together with various features of construction, it is to be understood that certain minor features of construction, combination and arrangement of parts may be altered to suit practical conditions provided such alterations are comprehended within the scope of what is claimed.

What is claimed is:—

In a beet harvester structure, the combination, of a supporting frame, an uprooting means carried by said supporting frame, an elevator for elevating beets from said uprooting means, a cylinder rotatably carried by said frame at the delivery end of said elevator and extending downwardly and rearwardly at an incline, a fan supported by said frame below the delivery end of said cylinder for blowing a blast of air about the beets upon passage from the cylinder, a supporting axle rotatably carried by said supporting frame, supporting wheels mounted upon said axle, a shaft extending transversely across said supporting frame, a second shaft extending longitudinally on said frame, means connecting said longitudinally extending shaft to said transversely extending shaft, means operatively connecting said longitudinally extending shaft and said cylinder for rotating said cylinder upon rotation of said longitudinally extending shaft, a relatively short shaft operatively connected to said elevator and said first named transversely extending shaft for operating said elevator upon rotation of said transversely extending shaft, a second relatively short shaft operatively connected to said transversely extending shaft, and means operatively connecting said second relatively short shaft and said fan for operating the fan upon rotation of said transversely extending shaft, and means for controlling the rotation of said transversely extending shaft by the rotation of said axle.

In testimony whereof I affix my signature in presence of two witnesses.

ISRAEL W. REDDING.

Witnesses:
WILBUR E. SWENSON,
ERIC H. SWENSON.

Copies of this patent may be obtained for five cents each, by addressing the "Commissioner of Patents, Washington, D. C."